Figure 1:
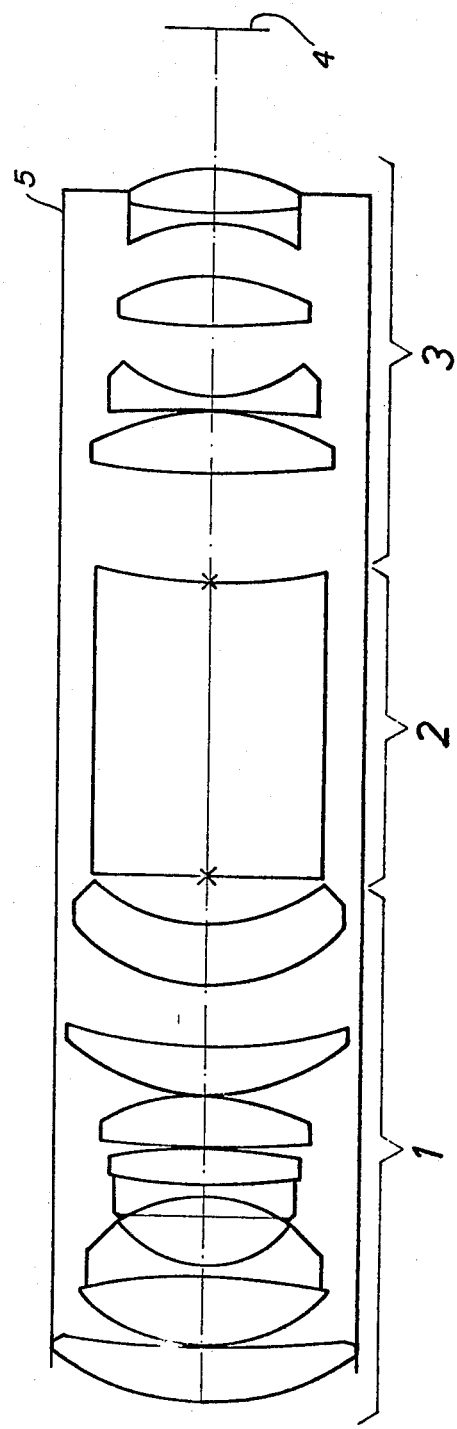

United States Patent [19]

Schlegel

[11] 4,266,848
[45] May 12, 1981

[54] OPTICAL SYSTEM FOR NIGHT-VISION GLASSES

[75] Inventor: Franz Schlegel, Munich, Fed. Rep. of Germany

[73] Assignee: Optische Werke G. Rodenstock, Munich, Fed. Rep. of Germany

[21] Appl. No.: 14,438

[22] Filed: Feb. 23, 1979

[30] Foreign Application Priority Data

Feb. 24, 1978 [DE] Fed. Rep. of Germany ....... 2808043

[51] Int. Cl.³ .................. G02B 13/16; G02B 23/12
[52] U.S. Cl. ............................ 350/8; 350/412; 350/463; 350/443; 250/213 VT
[58] Field of Search ............ 350/1.2, 1.3, 1.4, 52, 350/54, 214, 215, 220, 175 FS, 8; 250/213 VT

[56] References Cited

U.S. PATENT DOCUMENTS

| | | | |
|---|---|---|---|
| 3,099,701 | 7/1963 | Merigold | 350/189 |
| 3,737,667 | 6/1973 | Babb et al. | 250/213 VT |
| 3,992,085 | 11/1976 | Momiyama | 350/189 |
| 4,099,843 | 7/1978 | Imai | 350/215 |
| 4,178,075 | 12/1979 | Rogers | 350/175 FS |

FOREIGN PATENT DOCUMENTS 45-30304 10/1970 Japan ........................ 350/215

Primary Examiner—Jon W. Henry
Attorney, Agent, or Firm—Craig and Antonelli

[57] ABSTRACT

An optical system for night-vision glasses having a long focal length and a large image angle including an objective having a structural length less than 1.6f and an aperture ratio larger than 1.2, with the objective having a high distortion and an image angle of about 50°. An image amplifier is provided for receiving an image from the objective and for providing an amplified image output with a viewing optic being provided for receiving the amplified image output and for compensating for the distortion of the objective to provide a substantially distortion-free image to a viewer.

14 Claims, 4 Drawing Figures

OPTICAL SYSTEM FOR NIGHT-VISION GLASSES

The present invention relates to an optical system for night-vision glasses with a long focal length and large image angle, and with a small amplifier-cathode surface.

Optical systems of this type are used pairwise in so-called night-vision glasses. Such night-vision glasses are designed to permit driving a motor vehicle or performing manual labor or other activities during normal nocturnal darkness without using additional light sources.

It has been found that safe physical activity with the aid of night-vision glasses is largely dependent upon the image angle of the glasses. Image angles of at least 50° are desirable especially for driving a motor vehicle in darkness.

Known night-vision glasses have an image angle of 40° and larger images angles have thus far not been considered practicable owing to the distortion which increases with the image angle.

When a wide-angle lens is used, night-vision glasses assume unacceptable lengths and require very costly correction with an aperture ratio of approximately 1.2.

It is therefore an object of the present invention to provide an optical system for night-vision glasses which operates in a substantially distortion-free manner at the viewing side at an image angle of approximately 50°, and has a long focal length with a short structural length and a large aperture ratio.

In accordance with the present invention, the optical system for night vision glasses having a long focal length and a large image angle as well as a small amplifier-cathode surface of the image amplifier, includes an objective having a structural length less than 1.6 f and an aperture ratio larger than 1.2 with the objective having a high distortion of approximately 20% with an image angle of 50°, which distortion is compensated by a loupe or ocular disposed behind the image amplifier.

In the optical system according to the invention, a barrel distortion of up to 20% is introduced in the imaging plane of the objective, which practically coincides with the receiving side of the electronic image amplifier, for better utilization of the latter. Within the framework of the invention, the viewing optics, which can be in the form of a loupe or ocular, provided at the output side of the image amplifier, is so corrected that the distortion produced by the objective is practically cancelled out and the viewer sees a distortion-free image.

In accordance with the present invention, the objective is formed of a plurality of lenses of predetermined shape and spacing and may include exclusively lenses with spherical surfaces. Alternatively, the objective may be formed of a plurality of lenses as described above wherein essentially, two spherical lenses are replaced by one aspheric lens.

In accordance with another feature of the present invention, the viewing optics associated with the objective may be in the form of a loupe or ocular having a plurality of lenses of predetermined shape and spacing.

According to a further feature of the present invention, image erection can be accomplished in a known manner within the electronic image amplifier, whereby the transmitted image is for example, made erect with the aid of appropriately rotated fiber optics.

Figure 2:
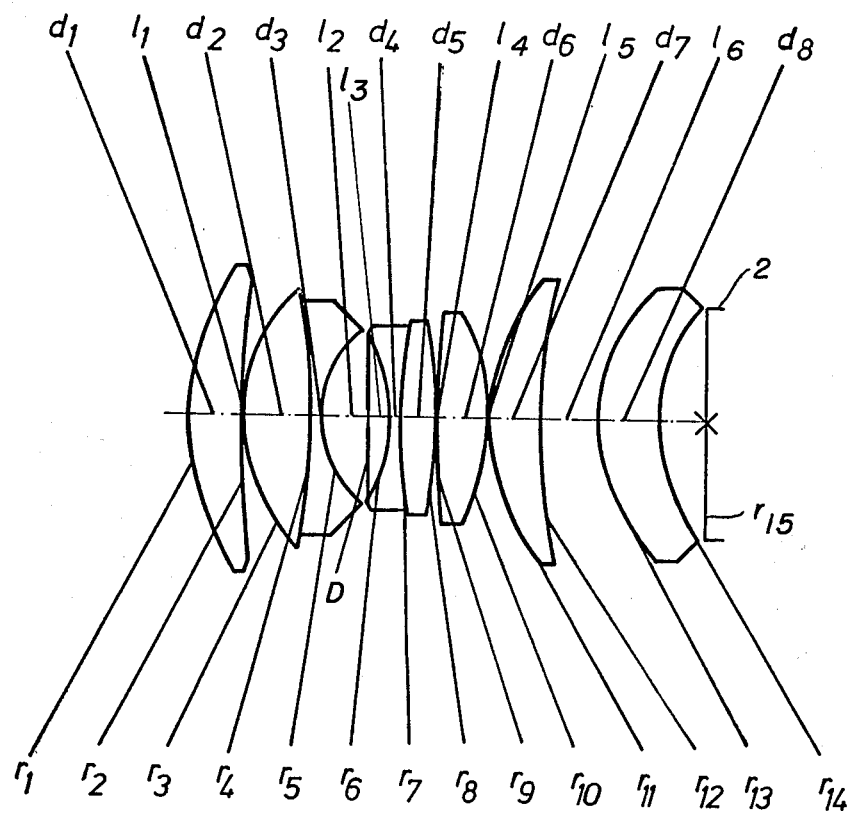
Figure 3:
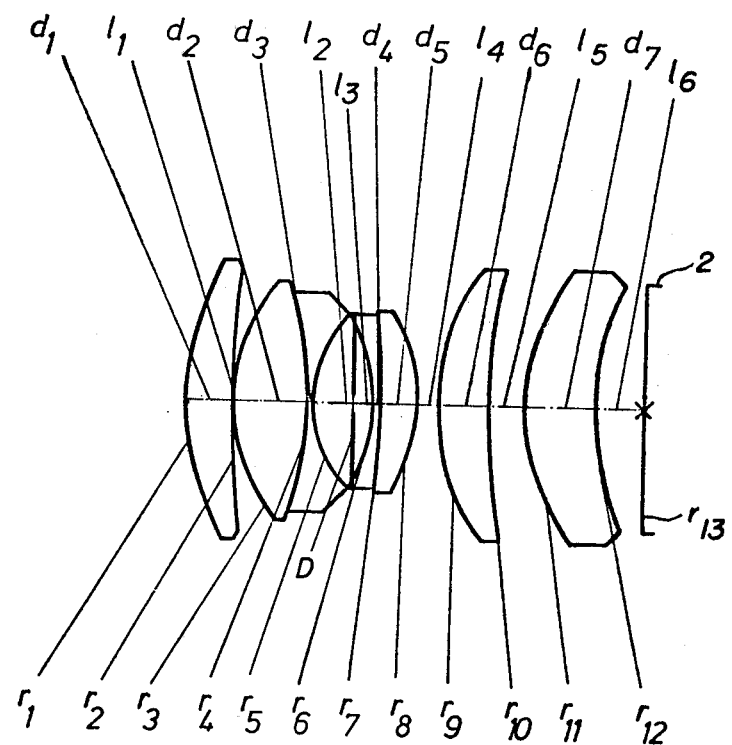
Figure 4:
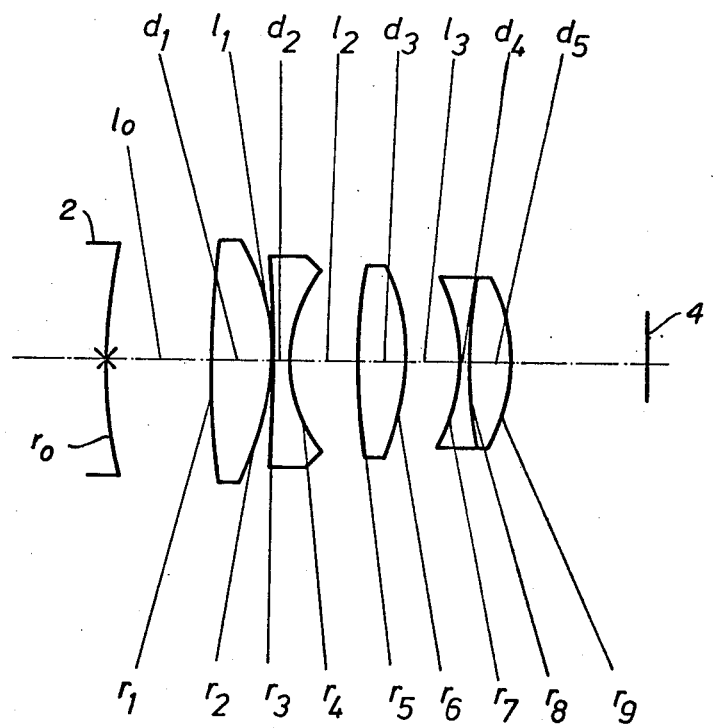

These and further objects, features and advantages of the present invention will become more obvious from the following description when taken in connection with the accompanying drawings which show, for purposes of illustration only, several embodiments in accordance with the present invention; and wherein FIG. 1 shows the arrangement according to the present invention in a longitudinal cross-section;

FIG. 2 is a longitudinal cross-section through an objective according to an embodiment of the present invention, FIG. 3 is a longitudinal section through an objective according to another embodiment of the present invention, and FIG. 4 is a longitudinal section through an embodiment of viewing optics in accordance with the present invention.

Referring now to the drawings, there is illustrated in FIG. 1, an optical system for night-vision glasses in accordance with the present invention including an objective 1, an electronic image amplifier 2 and viewing optics 3 in the form of a loupe. The entrance pupil of an observer utilizing the night-vision glasses is schematically represented by a line 4 at the right-hand side of this figure and the apparatus as illustrated is mounted in a mounting arrangement 5 in a known manner. The actual focal length f of the apparatus is 25 mm and for purposes of the following description, the objective and viewing optics will be discussed in terms of an assumed focal length f′ = 100 mm so as to enable a simple comparison with similar lenses which are generally described with reference to such a focal length.

The night-vision glasses which have a long focal length and a large image angle include an objective 1 having a structural length less than 1.6 f and an aperature ratio larger than 1.2. A barrel distortion of up to 20% which is a high distortion with an image angle of 50° is introduced in the imaging plane of the objective which practically coincides with the receiving side of the electronic image amplifier 2. The amplifier 2 provides for an erect image by utilization of, for example, appropriately rotated fiber optics. The output of the image amplifier 2 is supplied to the viewing optics 3 which is so corrected that the distortion produced by the objective 1 is substantially cancelled so that the viewer sees a substantially distortion-free image.

Referring to FIGS. 2-4, such figures illustrate structural arrangements of objectives and viewing optics in accordance with the present invention based upon an assumed focal length f′ = 100 mm. In such figures, the radii of the lens surfaces are designated r, the thickness d, and the air spaces l with respect to the optical axis and with the units of measurement of r, d and l as well as x and y being in mm. The letters $n_e$ represent the refractive indices and $v_e$ represents the Abbe numbers of the types of glass used for spectral lines e.

Referring now to FIG. 2, there is illustrated in longitudinal sectional view, an objective in accordance with one embodiment of the present invention and including a plurality of lenses of predetermined shape and positioning as listed below for an assumed focal length f′ = 100. As illustrated, a diaphragm D is included in the lens system which is formed exclusively of lenses with spherical surfaces. To aid in the understanding, the radii for the associated lens are bracketed:

|  |  |  |  | $n_e$ | $v_e$ |
|---|---|---|---|---|---|
| { $r_1$ = | 93.72 | | | | |
| | | $d_1$ = | 19.67 | 1.7918 | 25.87 |
| { $r_2$ = | 406.77 | | | | |
| | | $l_1$ = | 0.44 | | |

-continued

|  |  |  |  | $n_e$ | $v_e$ |
|---|---|---|---|---|---|
| { | $r_3 =$ | 61.08 | | | |
|  |  |  | $d_2 =$ 25.35 | 1.8017 | 28.17 |
|  | $r_4 =$ | −202.40 | | | |
|  |  |  | $d_3 =$ 3.06 | 1.9276 | 21.34 |
|  | $r_5 =$ | 38.54 | | | |
|  |  |  | $l_2 =$ 18.14 | | |
|  | D (diaphragm) | | | | |
|  |  |  | $l_3 =$ 6.56 | | |
| { | $r_6 =$ | −63.32 | | | |
|  |  |  | $d_4 =$ 4.37 | 1.9276 | 21.34 |
|  | $r_7 =$ | 205.34 | | | |
|  |  |  | $d_5 =$ 13.33 | 1.7923 | 47.15 |
|  | $r_8 =$ | −197.37 | | | |
|  |  |  | $l_4 =$ 0.44 | | |
| { | $r_9 =$ | 378.53 | | | |
|  |  |  | $d_6 =$ 18.58 | 1.7923 | 47.15 |
|  | $r_{10} =$ | −81.16 | | | |
|  |  |  | $l_5 =$ 0.44 | | |
| { | $r_{11} =$ | 75.53 | | | |
|  |  |  | $d_7 =$ 17.48 | 1.7162 | 53.61 |
|  | $r_{12} =$ | 174.02 | | | |
|  |  |  | $l_6 =$ 21.94 | | |
| { | $r_{13} =$ | 66.59 | | | |
|  |  |  | $d_8 =$ 21.86 | 1.9276 | 21.34 |
|  | $r_{14} =$ | 64.70 | | | |
|  |  |  | $l_7 =$ 16.82 | | |
| $r_{15} = \infty$ (the front surface of the image amplifier 2) | | | | | |

As is apparent, the lenses are positioned with respect to one another by the distances l along the optic axis and spaced from the front surface of the image amplifier by the distance $l_7$. Also, the diaphragm D is positioned at the distance $l_2$ along the axis from the radii surface $r_5$ and the distance $l_3$ from the radii surface $r_6$.

FIG. 3 illustrates another embodiment of an objective in accordance with the present invention wherein an aspherical lens is utilized. The data for such objective is listed below in a manner similar to that for the objective of FIG. 2 for an assumed focal length f′=100:

|  |  |  |  | $n_e$ | $v_e$ |
|---|---|---|---|---|---|
| { | $r_1 =$ | 81.82 | | | |
|  |  |  | $d_1 =$ 16.00 | 1.81265 | 25.24 |
|  | $r_2 =$ | 362.88 | | | |
|  |  |  | $l_1 =$ 0.40 | | |
| { | $r_3 =$ | 56.89 | | | |
|  |  |  | $d_2 =$ 23.99 | 1.74795 | 44.49 |
|  | $r_4 =$ | −144.99 | | | |
|  |  |  | $d_3 =$ 2.80 | 1.92765 | 21.34 |
|  | $r_5 =$ | 37.48 | | | |
|  |  |  | $l_2 =$ 14.00 | | |
|  | D (diaphragm) | | | | |
|  |  |  | $l_3 =$ 6.00 | | |
| { | $r_6 =$ | −49.89 | | | |
|  |  |  | $d_4 =$ 2.80 | 1.70587 | 40.75 |
|  | $r_7 =$ | −168.03 | | | |
|  |  |  | $d_5 =$ 11.80 | 1.74795 | 44.49 |
|  | $r_8 =$ | −50.89 | | | |
|  |  |  | $l_4 =$ 7.20 | | |
| { | $r_9 =$ | 72.15 | | | |
|  |  |  | $d_6 =$ 16.00 | 1.79227 | 47.15 |
|  | $r_{10} =$ | 173.55 | | | |
|  |  |  | $l_5 =$ 12.00 | | |
| { | $r_{11} =$ | 67.62 | | | |
|  |  |  | cc = 1.032 | | |
|  |  |  | $d_7 =$ 23.99 | 1.52458 | 59.22 |
|  | $r_{12} =$ | 86.67 | | | |
|  |  |  | $l_6 =$ 16.00 | | |
| $r_{13} = \infty$ (the front surface of the image amplifier 2) | | | | | | wherein:
cc = a constant for an aspheric surface $r_{11}$ according to the equation $$y^2 = 2rx - x^2(cc + 1);$$

x = the distance from vertex in the direction of the optical axis
y = the distance from the optical axis.

As is apparent, the lenses are positioned with respect to one another by the distances l along the optic axis and spaced from the front surface of the image amplifier by the distance $l_6$. Also, the diaphragm D is positioned at the distance $l_2$ from the radii surface $r_5$ and the distance $l_3$ from the radii surface $r_6$.

FIG. 4 illustrates a structural arrangement of the viewing optics of the present invention which may be utilized in conjunction with the objective of FIG. 2 or FIG. 3. The data for such viewing optics which is in the form of a loupe is listed below in a manner similar to that for the objectives of FIGS. 2 and 3 for an assumed focal length f′=100:

|  |  |  | $n_e$ | $v_e$ |
|---|---|---|---|---|
| $r_0 =$ | 150.73 | (the rear surface of the image amplifier 2) | | |
|  |  | $l_0 =$ 33.33 | | |
| $r_1 =$ | 235.20 | | | |
|  |  | $d_1 =$ 19.22 | 1.6940 | 54.47 |
| $r_2 =$ | −74.65 | | | |
|  |  | $l_1 =$ 0.34 | | |
| $r_3 =$ | −984.72 | | | |
|  |  | $d_2 =$ 4.52 | 1.6241 | 36.11 |
| $r_4 =$ | 43.83 | | | |
|  |  | $l_2 =$ 21.70 | | |
| $r_5 =$ | 198.61 | | | |
|  |  | $d_3 =$ 15.07 | 1.5187 | 63.96 |
| $r_6 =$ | −64.87 | | | |
|  |  | $l_3 =$ 16.72 | | |
| $r_7 =$ | −51.16 | | | |
|  |  | $d_4 =$ 3.01 | 1.6241 | 36.11 |
| $r_8 =$ | +175.11 | | | |
|  |  | $d_5 =$ 13.56 | 1.6940 | 54.47 |
| $r_9 =$ | −51.16 | | | |

As is apparent, the rear surface of the image amplifier is provided with a radius $r_0$ with the viewing optics being spaced from such rear surface along the optic axis by the distance $l_0$.

While I have shown and described several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein but intend to cover all such changes and modifications as are encompassed by the scope of the appended claims.

I claim:

1. An optical system for night-vision glasses having a long focal length and a large image angle comprising objective lens means having a structural length less than 1.6 f and an aperture ratio larger than 1.2, said objective lens means having a high distortion with an image angle of about 50°, an image amplifier means for receiving an image from said objective lens means for providing an amplified image output, and viewing optic means for receiving the amplified image output and for compensating for the distortion of said objective lens means to provide a substantially distortion-free image to a viewer.

2. An optical system according to claim 1, wherein said objective lens means has a high distortion up to 20%.

3. An optical system according to claim 2, wherein said objective lens means has a high distortion of about 20° with an image angle of 50°.

4. An optical system according to claim 3, further comprising mounting means for mounting said objective lens means, said image amplifier means and said viewing optics means.

5. An optical system according to one of claims 1 to 4, wherein said objective lens means includes a plurality of lenses of predetermined shape and having a predetermined spacing with respect to one another and to a front surface of said image amplifier means.

6. An optical system according to claim 5, wherein said objective lens means comprises a diaphragm and only spherical lenses.

7. An optical system according to claim 5, wherein said objective lens means comprises a diaphragm, spherical and aspherical lenses.

8. An optical system according to claim 5, wherein the front surface of said image amplifier means is substantially flat.

9. An optical system according to one of claims 1 or 4, wherein said viewing optic means comprises a plurality of lenses of predetermined shape and having a predetermined spacing with respect to one another and to a rear surface of said image amplifier means.

10. An optical system according to claim 9, wherein the rear surface of said image amplifier means is curved.

11. An optical system according to claim 1, wherein said image amplifier means includes means for providing an erect image at the output thereof.

12. An optical system according to claim 5, wherein said objective lens means has the following characteristics based on an assumed focal length f' = 100 mm:

a first lens having a first surface with a radius $r_1 = 93.72$ mm, a second surface with a radius $r_2 = 406.77$ mm, and a thickness along the optic axis $d_1 = 19.67$ mm with $n_e = 1.7918$ and $v_e = 25.87$;

a second lens having a first surface spaced from the second surface of said first lens a distance along the optic axis of $l_1 = 0.44$ mm, said second lens facing the first surface with a radius $r_3 = 61.08$ mm, a second surface with a radius $r_4 = -202.40$ mm, and a thickness along the optic axis $d_2 = 25.35$ mm with $n_e = 1.8017$ and $v_e = 28.17$;

a third lens having a first surface adjoining the second surface of said second lens and with the radius $r_4$, a second surface with a radius $r_5 = 38.54$ mm, and a thickness along the optic axis $d_3 = 3.06$ mm with $n_e = 1.9276$ and $v_e = 21.34$;

a diaphragm spaced from the second surface of said third lens a distance along the optic axis $l_2 = 18.14$ mm;

a fourth lens having a first surface spaced from said diaphragm a distance along the optic axis $l_3 = 6.56$ mm, said fourth lens having the first surface with a radius $r_6 = -63.32$ mm, a second surface with a radius $r_7 = 205.34$ mm, and a thickness along the optic axis $d_4 = 4.37$ mm with $n_e = 1.9276$ and $v_e = 21.34$;

a fifth lens having a first surface adjoining the second surface of said fourth lens and with the radius $r_7$, a second surface with a radius $r_8 = -197.37$ mm, and a thickness along the optic axis $d_5 = 13.33$ mm with $n_e = 1.7923$ and $v_e = 47.15$;

a sixth lens having a first surface spaced from the second surface of said fifth lens a distance along the optic axis $l_4 = 0.44$ mm, said sixth lens having the first surface with a radius $r_9 = 378.53$ mm, a second surface with a radius $r_{10} = -81.16$ mm, a thickness along the optic axis $d_6 = 18.58$ mm, with $n_e = 1.7923$ and $v_e = 47.15$;

a seventh lens having a first surface spaced from the second surface of said sixth lens a distance along the optic axis $l_5 = 0.44$ mm, said seventh lens having the first surface with a radius $r_{11} = 75.53$ mm, a second surface with a radius $r_{12} = 174.02$ mm, a thickness along the optic axis $d_7 = 17.48$ mm, with $n_e = 1.7162$ and $v_e = 53.61$; and an eighth lens having a first surface spaced from the second surface of said seventh lens a distance along the optic axis $l_6 = 21.94$ mm, said eighth lens having the first surface with a radius $r_{13} = 66.59$ mm, a second surface with a radius $r_{14} = 64.70$ mm, and a thickness along the optic axis $d_8 = 21.86$ mm, and with $n_e = 1.9276$ and $v_e = 21.34$;

the second surface of said eighth lens being spaced from the front surface of said image amplifier means a distance along the optic axis $l_7 = 16.82$ mm, the front surface of said image amplifier means having a radius $r_{15} = \infty$; and wherein $n_e$ represents the refractive index, and $v_e$ represents the Abbe number of the type of glass utilized for spectral lines e.

13. An optical system according to claim 5, wherein said objective lens means has the following characteristics based on an assumed focal length f' = 100 mm:

a first lens having a first surface with a $r_1 = 81.82$ mm, a second surface with a radius $r_2 = 362.88$ mm, and a thickness along the optic axis $d_1 = 16.00$ mm with $n_e = 1.81265$ and $v_e = 25.87$;

a second lens having a first surface spaced from said second surface of said first lens a distance along the optic axis of $l_1 = 0.40$ mm, said second lens having the first surface with a radius $r_3 = 56.89$ mm, a second surface with a radius $r_4 = -144.99$ mm, and a thickness along the optic axis $d_2 = 23.99$ mm with $n_e = 1.74795$ and $v_e = 44.49$;

a third lens having a first surface adjoining the second surface of said second lens and with the radius $r_4$, a second surface with a radius $r_5 = 37.48$ mm, and a thickness along the optic axis $d_3 = 2.80$ mm, with $n_e = 1.92765$ and $v_e = 21.34$;

a diaphragm spaced from the second surface of said third lens a distance along the optic axis $l_2 = 14.00$ mm;

a fourth lens having a first surface spaced from said diaphragm a distance along the optic axis $l_3 = 6.00$ mm, said fourth lens having the first surface with a radius $r_6 = -49.89$ mm, a second surface with a radius $r_7 = -168.03$ mm, and a thickness along the optic axis $d_4 = 2.80$ mm with $n_e = 1.70587$ and $v_e = 40.75$;

a fifth lens having a first surface adjoining the second surface of said fourth lens and with the radius $r_7$, a second surface with a radius $r_8 = -50.89$ mm, and a thickness along the optic axis $d_5 = 11.80$ with $n_e = 1.74795$ and $v_e = 44.49$;

a sixth lens having a first surface spaced from the second surface of said fifth lens a distance along the optic axis $l_4 = 7.20$ mm, said sixth lens having the first surface with a radius $r_9 = 72.15$ mm, a second surface with a radius $r_{10} = 173.55$ mm, a thickness along the optic axis $d_6 = 16.00$ mm, with $n_e = 1.79227$ and $v_e = 47.15$; and a seventh lens having a first surface spaced from the second surface of said sixth lens a distance along the optic axis $l_5=12.00$ mm, said seventh lens having the first surface with a radius $r_{11}=67.62$ cc=1.032 mm, a second surface with a radius $r_{12}=86.67$ mm, and a thickness along the optic axis $d_7=23.99$ mm with $n_e=1.52458$ and $v_e=59.22$;

the second surface of said seventh lens being spaced from the front surface of said image amplifier means a distance along the optic axis $l_6=16.00$ mm, the front surface of said image amplifier means having the radius $r_{13}=\infty$; and wherein $n_e$ represents the refractive index, and $v_e$ represents the Abbe number of the type of glass utilized for spectral lines e, cc=a constant for an aspheric surface $r_{11}$ according to the equation $y^2=2rx-x^2(cc+1)$ and x=the distance from the vertex in the direction of the optic axis, and y=the distance from the optic axis in millimeters.

14. An optical system according to claim 9, wherein said viewing optic means has the following characteristics based on an assumed focal length f'=100 mm:

a first lens having a first surface with a radius $r_1=235.20$ mm, a second surface with a radius $r_2=-74.65$ mm, and a thickness along the optic axis $d_1=19.22$ mm, with $n_e=1.6940$ and $v_e=54.47$;

a second lens having a first surface spaced from said second surface of said first lens a distance along the optic axis of $l_1=0.34$ mm, said second lens having the first surface with a radius $r_3=-984.72$ mm, a second surface with a radius $r_4=43.83$ mm, and a thickness along the optic axis $d_2=4.52$ mm, with $n_e=1.6241$ and $v_e=36.11$;

a third lens having a first surface spaced from said second surface of said second lens a distance along the optic axis of $l_2=21.70$ mm, said third lens having the first surface with a radius $r_5=198.61$ mm, a second surface with a radius $r_6=-64.87$ mm, and a thickness along the optic axis $d_3=15.07$ mm, with $n_e=1.5187$ and $v_e=63.96$;

a fourth lens having a first surface spaced from the second surface of said third lens a distance along the optic axis of $l_3=16.72$ mm, said fourth lens having the first surface with a radius $r_7=-51.16$ mm, a second surface with a radius $r_8=175.11$ mm, and a thickness along the optic axis $d_4=3.01$ mm, with $n_e=1.6241$ and $v_e=36.11$; and a fifth lens having a first surface adjoining the second surface of said fourth lens and with the radius $r_8$, a second surface with a radius $r_9=-51.16$ mm, and a thickness along the optic axis $d_5=13.56$ mm, with $n_e=1.6940$ and $v_e=21.34$;

the first surface of said first lens being spaced from the rear surface of said image amplifier means a distance along the optic axis $l_0=33.33$ mm, the rear surface of said image amplifier means having a radius $r_0=150.73$ mm; and wherein $n_e$ represents the refractive index, and $v_e$ represents the Abbe number of the type of glass utilized for spectral lines e.

* * * * *